(12) United States Patent
McReynolds et al.

(10) Patent No.: US 10,401,825 B2
(45) Date of Patent: Sep. 3, 2019

(54) AREA OCCUPANCY INFORMATION EXTRACTION

(71) Applicant: Hewlett-Packard Development Company, L.P., Houston, TX (US)

(72) Inventors: Alan A. McReynolds, Palo Alto, CA (US); Cullen E. Bash, Palo Alto, CA (US); Niru Kumari, Palo Alto, CA (US); Geoff M. Lyon, Palo Alto, CA (US); Amip J. Shah, Palo Alto, CA (US); Zhikui Wang, Palo Alto, CA (US); Rongliang Zhou, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 291 days.

(21) Appl. No.: 14/764,234

(22) PCT Filed: Jan. 31, 2013

(86) PCT No.: PCT/US2013/024027
§ 371 (c)(1),
(2) Date: Jul. 29, 2015

(87) PCT Pub. No.: WO2014/120180
PCT Pub. Date: Aug. 7, 2014

(65) Prior Publication Data
US 2015/0362909 A1    Dec. 17, 2015

(51) Int. Cl.
*G05B 19/401*  (2006.01)
*H04L 29/08*  (2006.01)
(Continued)

(52) U.S. Cl.
CPC .......... *G05B 19/401* (2013.01); *G06Q 10/04* (2013.01); *G06Q 50/10* (2013.01); *H04L 67/12* (2013.01); *G05B 2219/39155* (2013.01)

(58) Field of Classification Search
CPC ........ G05B 19/401; G05B 2219/39155; G06Q 10/04; G06Q 50/10; H04L 67/12
(Continued)

(56) References Cited

U.S. PATENT DOCUMENTS

| 8,253,553 B2 | 8/2012 | Wedig et al. |
| 2007/0003141 A1* | 1/2007 | Rittscher ............ G06K 9/00778 382/181 |

(Continued)

FOREIGN PATENT DOCUMENTS

JP    2011243517 A    12/2001

OTHER PUBLICATIONS

PCT Search report/Written Opinion ~ Application No. PCT/US2013/024027 dated Oct. 25, 2013 ~ 10 pages.
(Continued)

*Primary Examiner* — Mohammad Ali
*Assistant Examiner* — Joshua T Sanders
(74) *Attorney, Agent, or Firm* — Mannava & Kang, P.C.

(57) ABSTRACT

According to an example, a method for area occupancy information extraction may include receiving a signal from a sensor, and determining a number of occupants moving within a first area based on the signal. The method may further include determining when an occupant is moving and a direction of motion of the occupant based on the signal, and determining a most likely trajectory based on the direction of motion of the occupant. The method may also include controlling, by a processor, a service in the first area based on the determination of the number of occupants, the determination of when the occupant is moving and the direction of motion of the occupant, and/or the determination of the most likely trajectory.

13 Claims, 7 Drawing Sheets

(51) Int. Cl.
*G06Q 10/04* (2012.01)
*G06Q 50/10* (2012.01)

(58) Field of Classification Search
USPC .......................................................... 700/275
See application file for complete search history.

(56) References Cited

U.S. PATENT DOCUMENTS

| | | | |
|---|---|---|---|
| 2007/0272493 A1 | 11/2007 | Legez | |
| 2009/0261965 A1* | 10/2009 | Cum | G06Q 10/02 340/521 |
| 2010/0164732 A1* | 7/2010 | Wedig | G08B 7/066 340/577 |
| 2011/0106445 A1 | 5/2011 | Mayer et al. | |
| 2012/0146518 A1 | 6/2012 | Keating et al. | |
| 2012/0153868 A1 | 6/2012 | Gu et al. | |
| 2012/0209567 A1* | 8/2012 | Imahara | F24F 11/006 702/181 |
| 2012/0276517 A1* | 11/2012 | Banaszuk | G01C 21/00 434/365 |
| 2012/0310376 A1 | 12/2012 | Krumm et al. | |

OTHER PUBLICATIONS

Tomastick, R., et al., "Model-based Real-time Estimation of Building Occupancy During Emergency Egress", Feb. 27-29, 2008, 22 Pages.

Wahl, F., et al., "A distributed PIR-based approach for estimating people court in office environments", ACTLab, Signal Processing System, TU Eindhoven, Oct. 13, 2012, 8 Pages.

* cited by examiner

AREA OCCUPANCY INFORMATION EXTRACTION

BACKGROUND

Occupancy estimation is typically performed using motion detectors that monitor an area. For example, if a person enters the area, one or more motion detectors may sense the presence of the person based, for example, on movements by the person relative to the motion detectors. Data extracted from such motion detectors is typically limited to whether motion is detected or not, and which of the motion detectors are detecting motion. The data extracted from such motion detectors may be used for performing services such as turning lights on/off.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
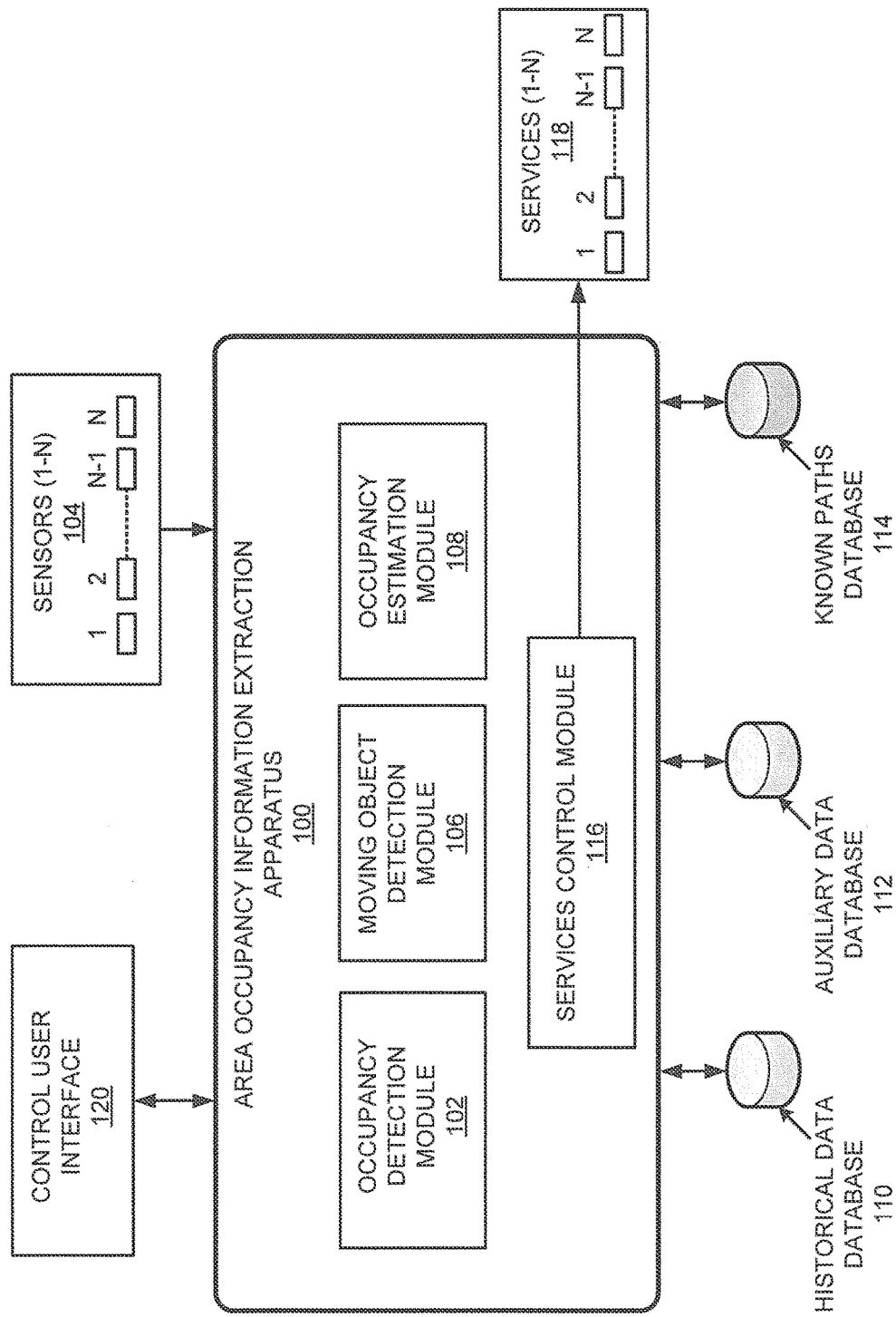
FIG. 1 illustrates an architecture of an area occupancy information extraction apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

For occupancy estimation typically performed using motion detectors that monitor an area (e.g., a particular space, conference room, hallway, etc.), data extracted from such motion detectors is limited because it does not contain information related to a number of people (e.g., occupants) in the area or a direction of motion of the people. Knowledge of whether people are entering or exiting the area can be used, for example, for starting, stopping, or maintaining services in the area. Examples of services may include lights, air conditioning systems, televisions, sound systems, window shades for natural light, computers, and generally any devices that can be turned on/off. Such services include associated costs of operation which can be reduced by turning the services off when they are not needed. For example, if an area is unoccupied, the services may be turned off. However, waiting for occupants to actually enter or exit an area, before services are turned on or off, can be inefficient. For example, waiting to turn on lights in a parking lot until a person has approached a range of motion sampled by a motion detector can present safety concerns. According to another example, waiting to switch on an air conditioning system until an occupant has entered an area may take too much time for the area to reach a desirable temperature. Similarly, waiting to switch off an air conditioning system until an occupant has left an area may be inefficient from a cost perspective if the air conditioning system could have been switched off a predetermined time period before the occupant has left the area such that the area temperature changes by less than a predetermined amount. Alternatively, instead of switching an air conditioning system off, a setting for the air conditioning system may be continuously changed as activity in an area is about to conclude.

According to an example, an area occupancy information extraction apparatus and a method are disclosed herein for area occupancy information extraction. The disclosed apparatus and method may determine a number of people that are entering, disposed within, or exiting a first area, and determine a second area the people are likely to proceed to, in order to efficiently start, stop, or maintain services in the first and second areas. Further, the disclosed apparatus and method may adapt services in the first and second areas based on the occupancy information detected, which may contain broader actions, such as turning services on or off, maintaining services, and/or adjusting services. For example, the apparatus and method disclosed herein may gradually dim lighting as people are leaving and moving further away from an area. As an example, a meeting may be proceeding in a conference room, and if it is determined that additional people are heading toward the conference room, the air conditioning settings for the conference room may be proactively changed. The apparatus and method disclosed herein may generally include sensors in the first and second areas. The sensors may include occupancy sensors such as visual, thermal, or sound based sensors, or generally any type of sensor that may be used to detect the presence of a person in an area. According to an example, when a first person enters the first area, the sensors may detect the presence of the person in the first area. Upon detection, services such as lights, air conditioning systems, televisions, sound systems, etc., may be ramped to an occupied mode. Subsequent entries to and exits from the first area by a person or people may be used to estimate aspects such as load on aft conditioning systems. Based, for example, on a number of people in the first area, the apparatus and method disclosed herein may also customize other settings, such as lighting, projectors, etc., for example, for presentations. Further, face recognition and/or motion tracking may be used to track particular individuals. Upon recognition, any pre-defined preferences for such individuals may be relayed to a services control module to control various services, as described herein.

Once a predetermined number of people have entered in the first area, the apparatus and method disclosed herein may continue to monitor further entries into or exits from the first area without changing settings until a predetermined number of people have exited the first area, or based on other criteria, such as, expiration of a predetermined time period. Once a predetermined number of people have exited the first area, or all of the people have exited the first area, the apparatus and method disclosed herein may change the service settings in the first area from an occupied mode to other modes, such as unoccupied, reduced occupancy, etc. The number of modes may be numerous, and are based on factors such as a number of occupants, an activity performed (e.g., party, presentation, etc.), and environment parameters (e.g., ambient temperature, natural light, etc.). The apparatus and method disclosed herein may use a predefined logic to determine the services that are needed and appropriate service settings (e.g., light intensity, amount of air flow, etc.).

In order to determine the second area people are likely to proceed to from the first area, the area occupancy information extraction apparatus and the method for area occupancy information extraction disclosed herein may also determine when a person is moving and a direction of motion of the person based on signals received from the sensors, and determine a most likely trajectory based on the direction of motion of the occupant. For example, the apparatus and method disclosed herein may use an area occupancy information extraction matrix that spatially overlays sensory inputs from the sensors over a layout of the first area to account for the number of people moving within the first area. As another example, the apparatus and method disclosed herein may use an area occupancy information extraction matrix that uses standardized units of measurement to represent different locations of the first area to account for the number of people moving within the first area, and may compare successive time periods for the area occupancy information extraction matrix to determine the most likely trajectory based on the direction of motion of the person. Based on the determination of the most likely trajectory, the apparatus and method disclosed herein may control a further service in a second area prior to the person being in the second area (e.g., as a person is moving toward the second area or leaving the first area).

The area occupancy information extraction apparatus and the method for area occupancy information extraction disclosed herein thus provide for the reduction of unnecessary service provisioning, and further provide for improved occupant comfort and convenience. The apparatus and method disclosed herein also provide for improved accuracy of occupancy information. Based on the occupancy information, the apparatus and method disclosed herein provide for optimization of service provisioning. Further, based on a determination of a direction people are likely to proceed to, the apparatus and method disclosed herein provide for optimization of service provisioning in a direction and/or area people are likely to proceed to.

FIG. 1 illustrates an architecture of an area occupancy information extraction apparatus 100, according to an example. Referring to FIG. 1, the apparatus 100 is depicted as including an occupancy detection module 102 to estimate a number of occupants (e.g., people) moving within a particular space (e.g., an area). A moving object detection module 106 may use the information from a sensor 104 to determine when an occupant is moving and/or a direction of motion of the occupant. An occupancy estimation module 108 may determine a most likely trajectory (e.g., vector) of any detected direction of motion of the occupant. The occupancy estimation module 108 may determine the most likely trajectory by using an area occupancy information extraction matrix that spatially overlays sensory inputs from the sensor 104 over a layout of an area to account for the number of people moving within the area. In addition, or alternatively, the occupancy estimation module 108 may determine the most likely trajectory by using an area occupancy information extraction matrix that uses standardized units of measurement to represent different locations of the area to account for the number of people moving within the area. The occupancy estimation module 108 may further determine the most likely trajectory based, for example, on historical data from a historical data database 110, auxiliary data from an auxiliary data database 112, and/or known paths from a known paths database 114. A services control module 116 may control a service 118, which may include a plurality of services 1-N for a current area of the occupant (e.g., a first area) and an area based on the direction of motion of the occupant (e.g., a second area). A control user interface (UI) 120 may be used to monitor, control, and add user-preferences for control of the service 118, and for display of information related to the apparatus 100.

The modules 102, 106, 108, and 116, and other components of the apparatus 100 that perform various other functions in the apparatus 100, may comprise machine readable instructions stored on a non-transitory computer readable medium. In addition, or alternatively, the modules 102, 106, 108, and 116, and other components of the apparatus 100 may comprise hardware or a combination of machine readable instructions and hardware.

With continued reference to FIG. 1, the occupancy detection module 102 may estimate a number of occupants (e.g., people) moving within a particular space (e.g., an area). The occupancy detection module 102 may receive input from the sensor 104, which may include the plurality of sensors 1-N disposed in an area, or a plurality of areas. For example, for sensors in multiple areas, the sensors may include a high resolution imager to scan a large region and provide segmented data regarding multiple areas or zones. The sensors 104 may include occupancy sensors such as visual, thermal, motion, chemical, or sound based sensors, or generally any type of sensor that may be used to detect the presence of an occupant or object in an area. For example, the visual sensors may include sensors, such as closed-circuit cameras, which may use image processing techniques, such as shape recognition techniques, or associative imaging, to interpret occupancy and/or motion. The sound based sensors may detect noise to determine whether a person is present in a given area. The thermal sensors, such as infrared (IR) cameras, may use post-processing to interpret occupancy and/or motion. The thermal sensors may also detect occupancy based on increases in heat load in an area due to the presence or absence of people. Further, the thermal sensors may also be used to determine body temperature of people in an area to determine if the people are comfortable. The chemical sensor may monitor, for example, a level of carbon dioxide in a room to determine the presence or absence of people.

The moving object detection module 106 may use the information from the sensor 104 to determine when an occupant is moving and/or a direction of motion of the occupant. For example, if the sensor 104 is a sound based sensor, the sensor 104 may determine if an occupant is present in an area. In addition, the sound based sensor may also use the Doppler effect in the ultrasound band and determine from pitch of the return signal whether an occupant is approaching or departing from the sound based sensor. If the sensor 104 is a visual sensor, the sensor 104 may use a camera, for example, with a wide field of view. The visual sensor may determine an edge of a moving object, such as a moving occupant in an area, for example, by using frame-to-frame comparison. Based, for example, on data from the sound based sensor and/or the visual sensor, the moving object detection module 106 may determine a number of moving occupants. Further, the moving object detection module 106 may use the data from the sensor 104 to estimate an approach/departure speed of moving occupants.

The occupancy detection module 102 may also use the speed of the moving occupants, for example, to further refine image detection to increase the accuracy of determining a number of moving occupants. For example, if more occupants are moving faster toward a particular space as opposed to away from the particular space, the occupancy detection module 102 may use such information to conclude that the number of occupants in the particular space will increase, and thus determine the correct number of moving occupants. The occupancy detection module 102 may also utilize a speed threshold to determine when occupants of a particular space may be considered to be moving toward or away from the particular space. For example, the occupancy detection module 102 may utilize a speed threshold to distinguish between people moving around within an auditorium (e.g., to change seats) versus people who may be leaving the auditorium altogether. Further, the pattern of the movement of people in a particular space may also be used by the occupancy detection module 102, for example, to determine the correct number of moving occupants. The services control module 116 may also utilize the speed information related to an occupant to control the service 118 accordingly. For example, for occupants moving at faster speeds in a particular direction, the services control module 116 may utilize the speed information to turn lights on faster along a hallway, as opposed to for occupants moving at slower speeds. Further, speed and pattern of the movement may also be used to trigger alarms, for example, to security personnel.

The occupancy estimation module 108 may determine a most likely trajectory (e.g., vector) of a detected direction of motion of an occupant. The occupancy estimation module 108 may receive data related to a number of people in a particular space and a direction of motion of the people within the particular space from the occupancy detection module 102 and the moving object detection module 106.

Figure 2:
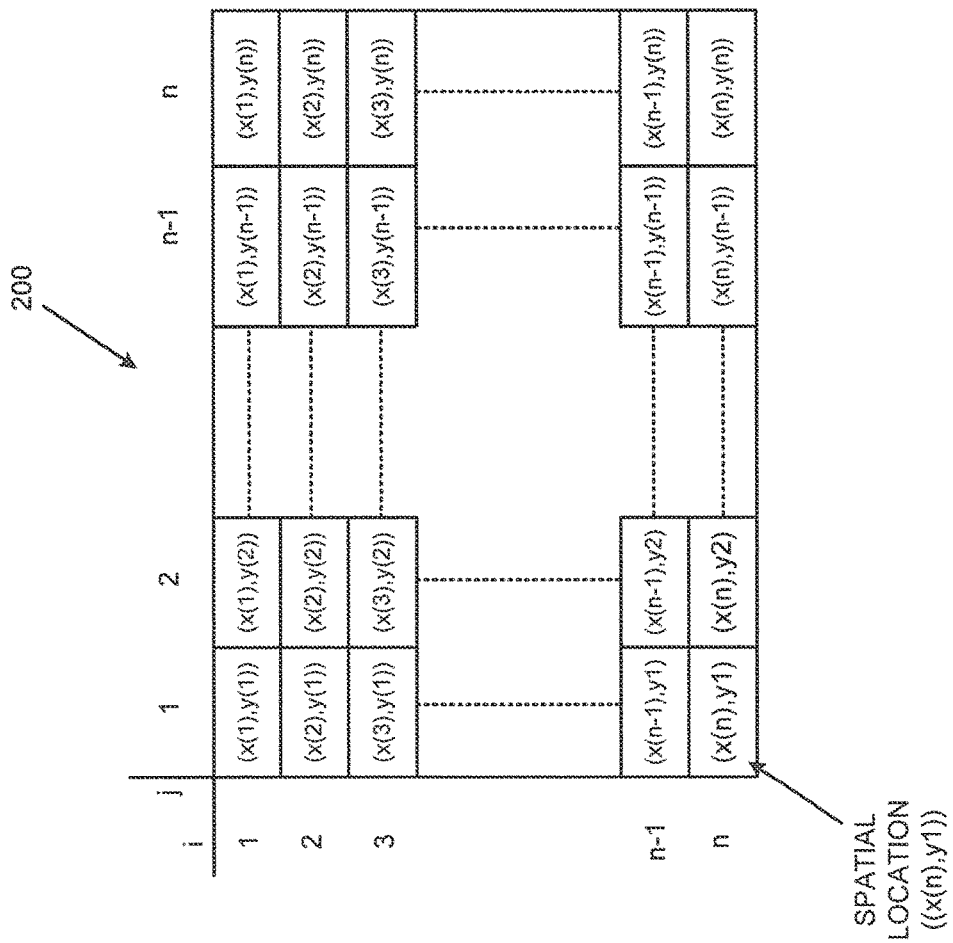
FIG. 2 illustrates an area occupancy information extraction matrix, according to an example of the present disclosure.

Referring to FIGS. 1 and 2, FIG. 2 illustrates an area occupancy information extraction matrix 200, according to an example of the present disclosure. As shown in FIG. 2, the occupancy estimation module 108 may use the area occupancy information extraction matrix 200, that spatially overlays sensory inputs from the sensor 104 over an (x,y) layout of a particular space, to determine the most likely trajectory based on the direction of motion of an occupant. According to a first approach, the area occupancy information extraction matrix 200 may include diagonals that have non-zero values. For the first approach, each index may correspond to a zone or region within a building (e.g., 1=conference room #A, so that the (x(1),y(1)) entry would indicate a number of occupants in the conference room #A). Further, all the other (x(1),y(i)) and (x(j),y(1)) entries in the matrix 200 would be zero. Similarly, an index may correspond to a hallway #X (e.g., 2=hallway #X, so that the (x(2),y(2)) entry would indicate a number of occupants in the hallway #X). Further, all the other (x(2),y(i)) and (x(j),y(2)) entries in the matrix would be zero. For such a matrix configuration, each entry may correspond to features of an area, such as a floor of a building, etc. The first approach may be used, for example, if services can be effectively mapped into such zones or regions.

According to a second approach, rows of the area occupancy information extraction matrix 200 may correspond, for example, to spatial locations, zones, or regions, and columns may correspond to time-steps. For example, the first row may represent a conference room #A such that the (x(i),y(1)) entry shows the occupancy of the conference room #A at time t=1, the (x(i),y(2)) entry shows the occupancy of the conference room #A at time t=2, and so forth. For the second approach, comparing successive entries in the first row (i.e., i=1) may be used to approximate the rate of change of occupancy for the conference room #A. Similarly, comparing entries in the second row (i.e., i=2) may be used to approximate the rate of change of occupancy for a conference room #B, etc. This setup of the matrix 200 may therefore be used to determine a speed an occupant is travelling at, and to further determine a most likely trajectory (e.g., vector) of any detected direction of motion of the occupant.

Figure 3:
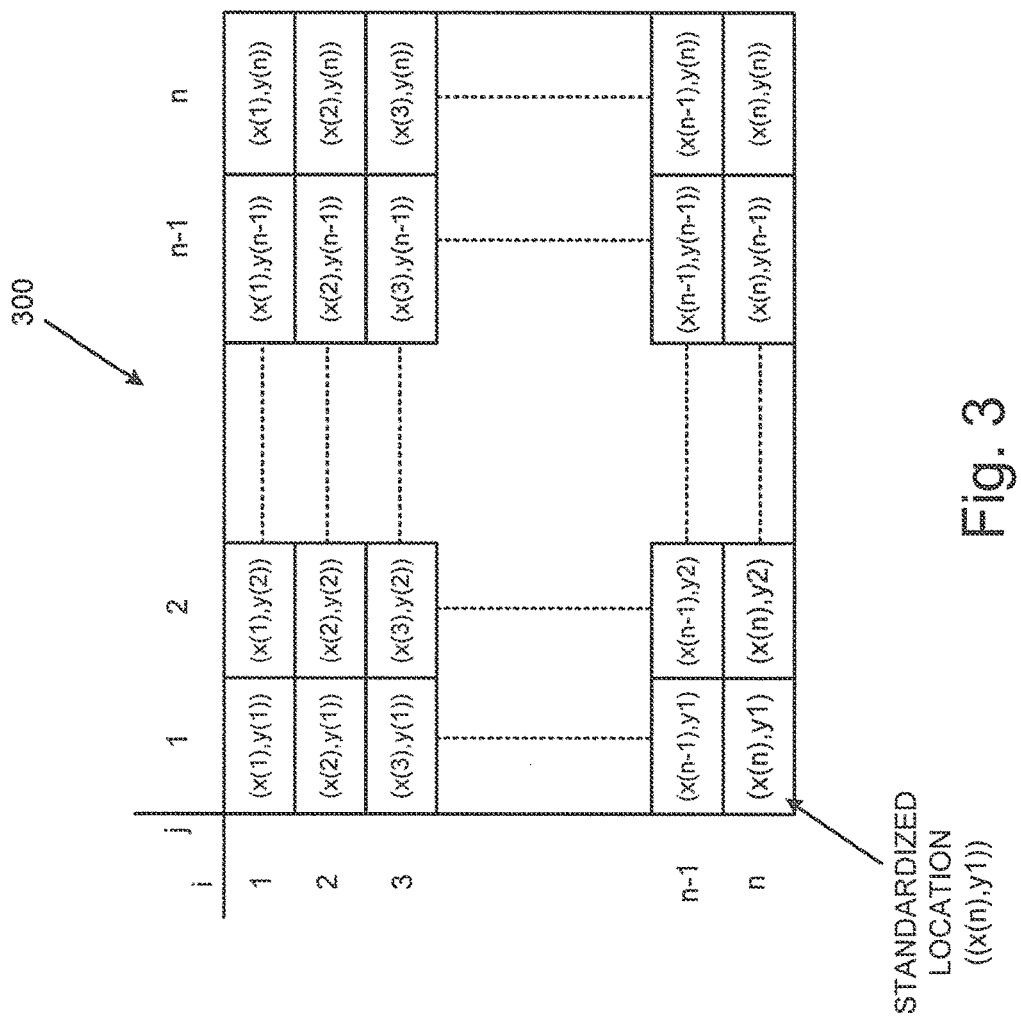
FIG. 3 illustrates another area occupancy information extraction matrix, according to an example of the present disclosure.

Referring to FIGS. 1 and 3, FIG. 3 illustrates another example of an area occupancy information extraction matrix 300, according to an example of the present disclosure. The area occupancy information extraction matrix 300 may represent a third approach of utilizing the area occupancy information extraction matrix 200. The third approach may be considered similar to the first and second approaches, but may use standardized units as discussed below. As shown in FIG. 3, the occupancy estimation module 108 may use the area occupancy information extraction matrix 300 that uses standardized units of measurement to represent different locations of the particular space, to determine the most likely trajectory based on the direction of motion of an occupant. For example, for the matrix 300, i=0 may correspond to an entry point of a particular space (e.g., a building), i=1 may correspond to occupancy at 1 meter into the particular space in an x-direction, and j=1 may correspond to the occupancy at 1 meter into the particular space in a y-direction. Thus, the (x(1),y(1)) entry of the matrix 300 may correspond to a current number of occupants at 1 m in an x-direction and 1 m in a y-direction of the particular space. Similarly, the (x(2),y(2)) entry of the matrix 300 may correspond to a current number of occupants at 2 m in the x-direction and 2 m in the y-direction of the particular space. Thus, generally, the (x(n),y(n)) entry of the matrix 300 may correspond to a current number of occupants at n m in the x-direction and n m in the y-direction of the particular space. Adjacent locations of the matrix 300 may also correspond to standardized time units. For example, entries (x(1),y(1)) and (x(2),y(2)) that are standardized at 1 m apart, may also be standardized at 1 second apart with respect to how long it may take for an occupant to travel from location (x(1),y(1)) to (x(2),y(2)), for example, by assuming or estimating a rate of travel. The standardized setup of the matrix 300 may therefore be used to determine a speed an occupant is travelling at, and to further determine a most likely trajectory (e.g., vector) of any detected direction of motion of the occupant. For example, comparing the same (x(i),y(j)) entries at two different time-steps (i.e., after the matrix 300 has been updated) may be used to identify the rate of change (i.e., speed).

For the first to third approaches of utilizing the area occupancy information extraction matrices described herein with reference to FIGS. 2 and 3, the matrices 200, 300 may provide a snapshot at a specific instance of time. The values of the matrices 200, 300 may then be updated at a next time step. By comparing such sequential time series, the rate of change of occupancy (i.e., the speed) may be approximated.

Further, for the matrices 200, 300, the spatial location may also be represented by three dimensions (e.g., (x, y, z)).

Referring to FIGS. 1-3, the occupancy estimation module 108 may use the matrices 200 or 300 to determine a most likely trajectory (e.g., vector) of any detected direction of motion of an occupant. For example, the occupancy estimation module 108 may compare two successive time periods to determine a most likely trajectory (e.g., vector) of any detected direction of motion of an occupant. For the matrix 300 that is indexed to standardized spatial units, the time interval over which the matrix 300 has been updated may implicitly represent the speed of an occupant in motion.

With continued reference to FIGS. 1-3, given the matrices 200 or 300 at a time-t, the occupancy estimation module 108 may determine likely values of the matrices 200 or 300 at a next time increment. The occupancy estimation module 108 may determine the most likely trajectory based, for example, on historical data from the historical data database 110, auxiliary data from the auxiliary data database 112, and/or known paths from the known paths database 114.

With respect to historical data from the historical data database 110, in order to generate the historical data, initially, general occupancy data may be compiled over time to generate typical sequences of values for each (i,j) coordinate in the matrices 200 and/or 300. The occupancy estimation module 108 may use the general occupancy data to locate a last set of readings (e.g., over the past 24 hours) to determine the next likely sequence of values for each (i,j) coordinate in the matrices 200 and/or 300. The general occupancy data may be continuously updated to improve accuracy of the most likely trajectory based on the historical data. For example, if at time t=0 seconds the (x(1),y(1)) entry for the area occupancy information extraction matrix 200 includes 10 occupants, the value of the (x(1),y(1)) entry may be used to determine corresponding historical data that indicates values for the remaining locations for the matrix 200. For example, for a conference room with occupants at a table, historical data may be used to imply that the area away from the table will be unoccupied. Further, if at time t=10 seconds, the (x(1),y(1)) entry and the (x(3),y(3)) entry for the area occupancy information extraction matrix 200 respectively include 2 and 8 occupants, the values of the (x(1),y(1)) and (x(3),y(3)) entries may be used to determine corresponding historical data that indicates values for the remaining locations for the matrix 200, and update the matrix 200. In this manner, the matrices 200 and 300 may be continuously updated, and the occupancy estimation module 108 may determine the most likely trajectory of the occupants of a particular space.

With respect to auxiliary data from the auxiliary data database 112, if additional data such as an occupant's calendar (e.g., an events calendar) is available, then such data may be used by the occupancy estimation module 108 to determine the most likely trajectory. For example, if it is known that a meeting in a particular conference room is about to start and occupant motion is detected in the direction of the conference room, the occupancy estimation module 108 may determine that a next sequence in time will correspond to a matrix coordinate where many occupants in motion are closer to the conference room. The occupancy estimation module 108 may thus update a matrix (e.g., the matrices 200 and/or 300) based on auxiliary data from the auxiliary data database 112. The occupancy estimation module 108 may also use correlations between different occupants' trajectories. For example, it may be known that people in a research group are likely to attend the same meetings. Thus, the occupancy estimation module 108 may also use correlations between the trajectories of people in the research group to conclude that the people are likely to attend the same meeting. The occupancy estimation module 108 may also use time-of-day characteristics. For example, it is more likely that people will be leaving a building at the beginning of a lunch break and re-entering the building at the end of a lunch break.

With respect to known paths from the known paths database 114, known paths (i.e., typical paths) may be established based, for example, on historical data or surveys of users. For example, occupants walking in between cubicles may be most likely to head towards a larger aisle (e.g., a main thoroughfare) in an office environment. The surveys may be obtained by using the control user interface 120.

The services control module 116 may control the service 118, which may include the plurality of services 1-N for a current area of the occupant (e.g., a first area), an area based on the direction of motion of the occupant (e.g., a second area), or multiple areas if multiple occupants are entering or exiting an area toward different areas, each of whom may have a different path. For example, the services control module 116 may use the estimate of a number of occupants moving within a particular space from the occupancy detection module 102 to start, stop, adjust, or maintain services in the particular space. For example, if the particular space is unoccupied, the services 118 may be turned off by the services control module 116. The services control module 116 may further use information related to when an occupant is moving and/or a direction of motion of the occupant from the moving object detection module 106, and further use information related to a most likely trajectory (e.g., vector) of a detected direction of motion of the occupant from the occupancy estimation module 108 to anticipate and predict a direction of motion of an occupant within a first area, toward a second area, or away from a first area, such that services can be turned on in advance, turned off when appropriate, maintained, or adjusted appropriately based on the detected information.

For example, the services control module 116 may use information from the moving object detection module 106 and the occupancy estimation module 108 to turn services on in a second area as occupants depart a first area. For example, the services control module 116 may turn on lights in a parking lot (i.e., a second area) as an occupant of a building (i.e., a first area) exits the building, or light up a hallway with different brightness levels in advance as an occupant proceeds down or towards the hallway. According to another example, the services control module 116 may switch on an air conditioning system as a plurality of occupants head towards a conference room such that the conference room is at a desirable temperature prior to or shortly upon arrival of occupants in the conference room. According to a further example, the services control module 116 may switch off an air conditioning system or switch an air conditioning system to a lower setting at a predetermined time period before the occupants have left the conference room such that the conference room temperature changes by a predetermined amount that is acceptable to the occupants. According to another example, the services control module 116 may tune services such as lighting, air conditioning, etc., based upon a number of people within an area. For example, if a number of people in a conference room increases, the services control module 116 may automatically adjust an air conditioning system to account for additional heat load in the conference room.

The services control module 116 may also correlate behavior of occupants of a particular area over time for control of the service 118. For example, the services control module 116 may control the service 118 based on how occupants of a particular area historically control the service 118. For example, if occupants of a particular area control lighting or air conditioning services in a particular manner, the services control module 116 may learn the occupant behavior and control the lighting or air conditioning services in a similar manner. Data related to an occupant's behavior over time may also be stored in the historical data database 110.

The services control module 116 may also prioritize control of a particular service based on a number of occupants in a particular area to resolve conflicts. For example, if a particular area has 10 occupants that are moving toward a conference room and 2 occupants that are moving within the particular area, the services control module 116 may prioritize control of the conference room over any conflicting control based on the 2 occupants that are moving within the particular area. Such conflicts may also be resolved based on the historical data from the historical data database 110. Conflicts may also be resolved by the services control module 116 based on conflict resolution rules that determine if a particular service can or cannot be controlled within a particular time period, and a priority of controlling certain services. For example, for an air conditioning system that can take longer to heat or cool a particular area, the conflict resolution rules may be used to prioritize turning on an air conditioning system in a conference room if it is determined that occupants are likely to proceed to a conference room, as opposed to turning on lighting, which can be controlled virtually instantaneously. Thus, the services control module 116 may effectively use a lower threshold for turning on/off certain services based on the conflict resolution rules.

The services control module 116 may also control the service 118 to maintain certain environmental status. For example, for a particular area that is to be maintained at a given temperature, the services control module 116 may control the service 118 (e.g., an air conditioning system) by taking into account fluctuations in heat load in the particular area based on changes in occupancy as determined by the occupancy detection module 102, the moving object detection module 106, and the occupancy estimation module 108.

The services control module 116 may also control the service 118 based on control models. For example, for a particular area that is to be maintained at a given temperature, the services control module 116 may control the service 118 (e.g., an air conditioning system) by first determining changes in occupancy as determined by the occupancy detection module 102, the moving object detection module 106, and the occupancy estimation module 108, and using the changes in the occupancy with appropriate control models that govern how a particular service is to be controlled. For example, a room temperature control model may indicate that services in a particular room are to be controlled in a first manner for occupancy of less than 10 occupants, in a second manner for occupancy between 11 and 20 occupants, and in a third manner for occupancy greater than 20 occupants.

The control UI 120 may be used to monitor, control, and add user-preferences for control of the service 118, and for display of information related to the apparatus 100. For example, the control UI 120 may display occupancy in a particular area, changes of occupancy in the particular area, and/or a most likely trajectory of any detected direction of motion of an occupant. A user of the area occupancy information extraction apparatus 100 may use the control UI 120 to enter user-preferences, such as desired operation of the service 118, data related to the databases 110, 112, and 114, and generally any data related to the occupancy information extraction apparatus 100 that may affect the desired operation of the service 118.

Figure 4:
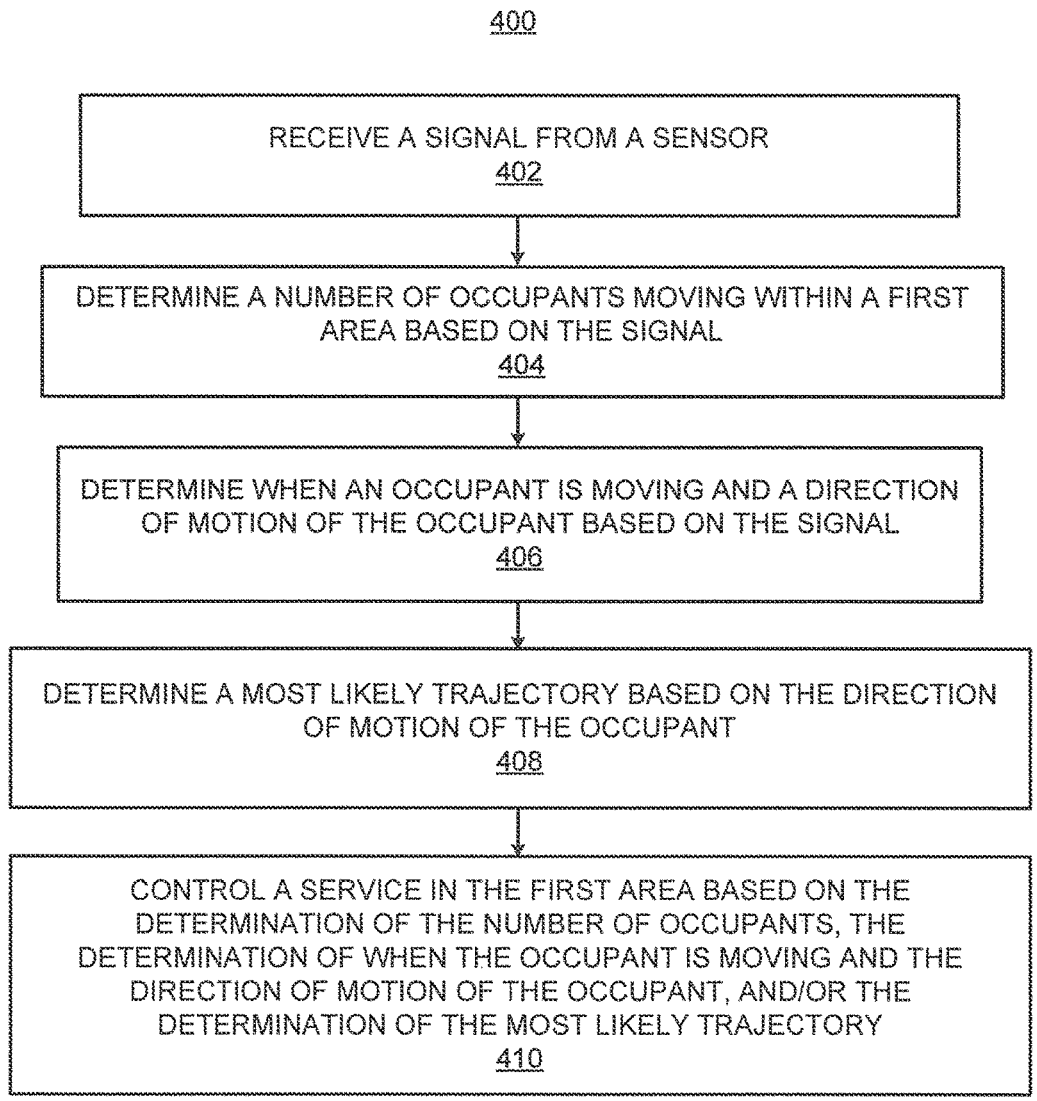
FIG. 4 illustrates a method for area occupancy information extraction, according to an example of the present disclosure.
Figure 5:
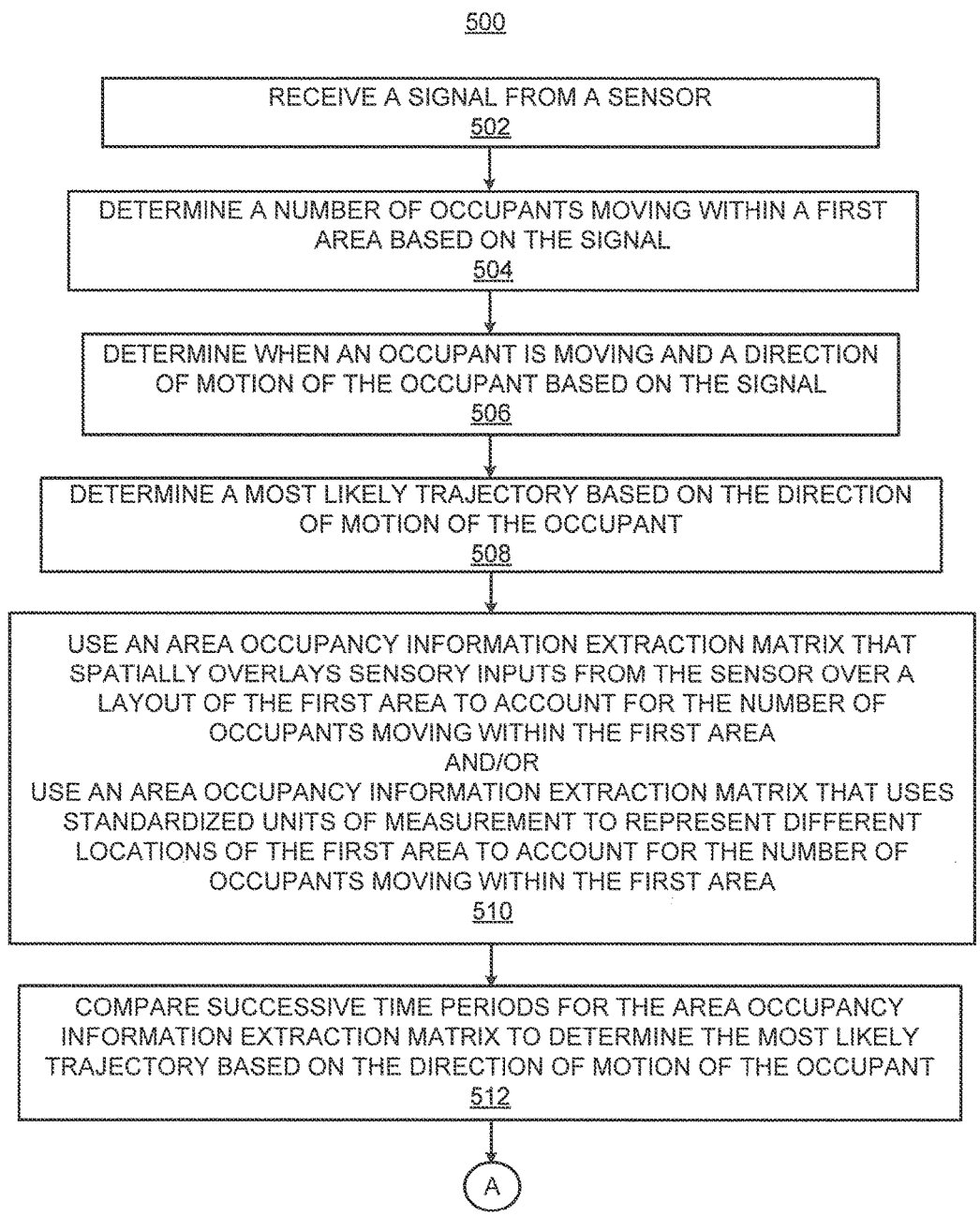
FIG. 5 illustrates further details of the method for area occupancy information extraction, according to an example of the present disclosure.
Figure 5:
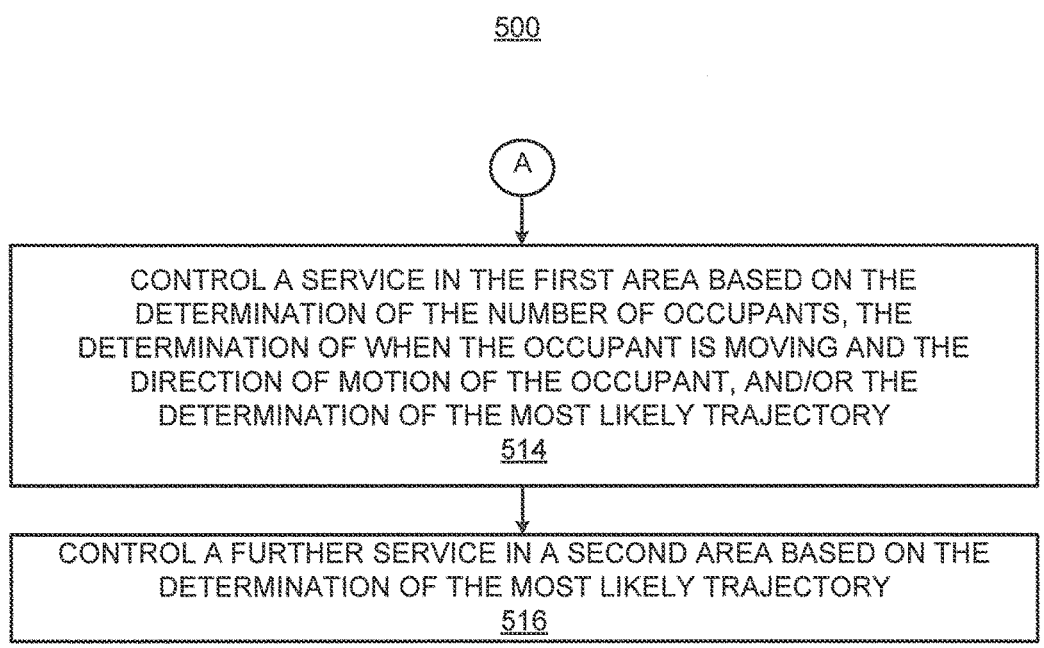

FIGS. 4 and 5 respectively illustrate flowcharts of methods 400 and 500 for area occupancy information extraction, corresponding to the example of the area occupancy information extraction apparatus 100 whose construction is described in detail above. The methods 400 and 500 may be implemented on the area occupancy information extraction apparatus 100 with reference to FIG. 1 by way of example and not limitation. The methods 400 and 500 may be practiced in other apparatus.

Referring to FIG. 4, for the method 400, at block 402, a signal from a sensor may be received. For example, referring to FIG. 1, the occupancy detection module 102 may receive input from the sensor 104, which may include the plurality of sensors 1-N disposed in an area, or a plurality of areas.

At block 404, a determination is made of a number of occupants moving within a first area based on the signal. For example, referring to FIG. 1, the occupancy detection module 102 may estimate a number of occupants (e.g., people) moving within a particular space (e.g., an area).

At block 406, a determination is made of when an occupant is moving and a direction of motion of the occupant based on the signal. For example, referring to FIG. 1, the moving object detection module 106 may use the information from the sensor 104 to determine when an occupant is moving and/or a direction of motion of the occupant.

At block 408, a determination is made of a most likely trajectory based on the direction of motion of the occupant. For example, referring to FIG. 1, the occupancy estimation module 108 may determine a most likely trajectory (e.g., vector) of a detected direction of motion of the occupant.

At block 410, a service in the first area is controlled based on the determination of the number of occupants, the determination of when the occupant is moving and the direction of motion of the occupant, and/or the determination of the most likely trajectory. For example, referring to FIG. 1, the services control module 116 may control the service 118, which may include the plurality of services 1-N for a current area of the occupant (e.g., the first area) and an area based on the direction of motion of the occupant (e.g., a second area).

Referring to FIG. 5, for the method 500, at block 502, a signal from a sensor may be received.

At block 504, a determination is made of a number of occupants moving within a first area based on the signal. For example, the signal from the sensor 104 may be used for shape recognition to determine the number of occupants moving within the first area. According to another example, the signal from the sensor 104 may be used for noise detection to determine presence of the occupant within the first area. According to a further example, the signal from the sensor 104 may be used for detection of changes in heat load within the first area to determine presence of the occupant within the first area.

At block 506, a determination is made of when an occupant is moving and a direction of motion of the occupant based on the signal.

At block 508, a determination is made of a most likely trajectory based on the direction of motion of the occupant. Determining the most likely trajectory may be based on auxiliary data from an events calendar for the occupant.

Further, determining the most likely trajectory may be based on known paths of the occupant.

At block 510, determining the most likely trajectory based on the direction of motion of the occupant may include using an area occupancy information extraction matrix that spatially overlays sensory inputs from the sensor over a layout of the first area to account for the number of occupants moving within the first area, and/or using an area occupancy information extraction matrix that uses standardized units of measurement to represent different locations of the first area to account for the number of occupants moving within the first area. For example, referring to FIG. 2, the occupancy estimation module 108 may use the area occupancy information extraction matrix 200 that spatially overlays sensory inputs from the sensor over a layout of the first area to account for the number of occupants moving within the first area. Alternatively, referring to FIG. 3, the occupancy estimation module 108 may use the area occupancy information extraction matrix 300 that uses standardized units of measurement to represent different locations of the first area to account for the number of occupants moving within the first area. Determining the most likely trajectory may be based on historical data that represents typical sequences of values for coordinates of the area occupancy information extraction matrix (e.g., matrices 200 or 300).

At block 512, successive time periods may be compared for the area occupancy information extraction matrix to determine the most likely trajectory based on the direction of motion of the occupant. For example, referring to FIG. 1, the occupancy estimation module 108 may compare successive time periods for the area occupancy information extraction matrix (e.g., matrices 200 or 300) to determine the most likely trajectory based on the direction of motion of the occupant.

At block 514, a service, or multiple services, in the first area may be controlled based on the determination of the number of occupants, the determination of when the occupant is moving and the direction of motion of the occupant, and/or the determination of the most likely trajectory.

At block 516, a further service (or multiple services) may be controlled in a second area based on the determination of the most likely trajectory. For example, referring to FIG. 1, the services control module 116 may control a further service in a second area based on the determination of the most likely trajectory.

Figure 6:
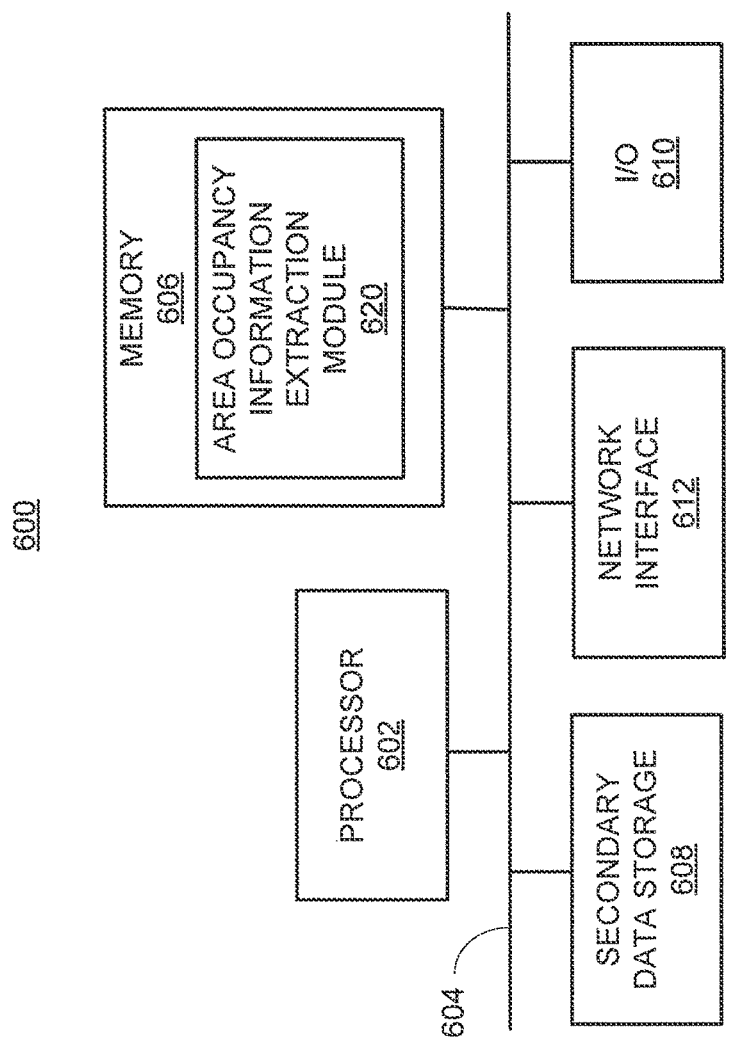
FIG. 6 illustrates a computer system, according to an example of the present disclosure.

FIG. 6 shows a computer system 600 that may be used with the examples described herein. The computer system represents a generic platform that includes components that may be in a server or another computer system. The computer system 600 may be used as a platform for the apparatus 100. The computer system 600 may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 that may implement or execute machine readable instructions performing some or all of the methods, functions and other processes described herein. Commands and data from the processor 602 are communicated over a communication bus 604. The computer system also includes a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include an area occupancy information extraction module 620 including machine readable instructions residing in the memory 606 during runtime and executed by the processor 602. The area occupancy information extraction module 620 may include the modules 102, 106, 108, and 116 of the apparatus shown in FIG. 1.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for area occupancy information extraction, the method comprising:
   receiving signals from sensors;
   determining, by a processor, a number of occupants in each of a plurality of spatial locations based on the received signals;
   generating, by the processor, an occupancy information extraction matrix to include entries that include overlays of the received signals over a layout of the plurality of spatial locations, the occupancy information extraction matrix also including correlations between the number of occupants in each of the plurality of spatial locations over time periods;
   determining, by the processor, when an occupant is moving and a direction of motion of the occupant based on the received signals;
   comparing entries in the occupancy information extraction matrix of the number of occupants in the plurality of spatial locations corresponding to successive time periods determine a most likely trajectory of the occupant;
   comparing entries in the occupancy information extraction matrix to approximate a rate of change of occupancy for a first spatial location and a rate of change of occupancy for a second spatial location;
   determining, from the approximate rate of change of occupancy for the first spatial location and the rate of change of occupancy for the second spatial location, a speed of an occupant travelling from the first spatial location to the second spatial location; and
   controlling, by a processor, a service in a first area based on at least one of the determination of the number of occupants, the determination of when the occupant is moving and the direction of motion of the occupant, and the determination of the most likely trajectory.

2. The method of claim 1, further comprising:
   using the received signals from the sensors for shape recognition to determine a number of occupants moving within the first area.

3. The method of claim 1, further comprising:
using the signals received from the sensors for noise detection to determine presence of occupants in each of the plurality of spatial locations.

4. The method of claim 1, further comprising:
using the signals received from the sensors for detection of changes in heat load within the plurality of spatial locations to determine presence of occupants in each of the plurality of spatial locations.

5. The method of claim 1, wherein receiving signals from sensors further comprises receiving signals from at least one of a visual sensor, a thermal sensor, a sound based sensor, and a chemical sensor.

6. The method of claim 1, wherein to determine the most likely trajectory of the occupant, the method further comprises:
determining the most likely trajectory based on historical data that represents typical sequences of values for coordinates of the occupancy information extraction matrix.

7. The method of claim 1, wherein to determine the most likely trajectory of the occupant, the method further comprises:
determining the most likely trajectory based on auxiliary data.

8. The method of claim 1, wherein to determine the most likely trajectory of the occupant, the method further comprises:
determining the most likely trajectory based on known paths of the occupant.

9. The method of claim 1, further comprising:
controlling a further service in a second area based on the determination of the most likely trajectory.

10. An area occupancy information extraction apparatus comprising:
a memory storing machine readable instructions to:
receive signals from sensors;
determine a number of occupants in each of a plurality of spatial locations based on the received signals;
generate an occupancy information extraction matrix that includes correlations between the number of occupants in each of the plurality of spatial locations over time periods and entries that include overlays of the received signals over a layout of the plurality of spatial locations;
determine when an occupant is moving and a direction of motion of the occupant based on the received signals;
compare entries in the occupancy information extraction matrix to approximate a rate of change of occupancy for a first spatial location and a rate of change of occupancy for a second spatial location and determine a most likely trajectory of the occupant based on the direction of motion of the occupant by comparing the number of occupants in the plurality of spatial locations corresponding to successive time periods as indicated in the entries of the occupancy information extraction matrix;
determine, from the approximate rate of change of occupancy for the first spatial location and the rate of change of occupancy for the second spatial location, a speed of an occupant travelling from the first spatial location to the second spatial location; and
control a service in an area based on at least one of the determination of the number of occupants, the determination of when the occupant is moving and the direction of motion of the occupant, and the determination of the most likely trajectory; and
a processor to implement the machine readable instructions.

11. The area occupancy information extraction apparatus of claim 10, wherein the machine readable instructions are further to cause the processor to:
determine the most likely trajectory based on historical data that represents typical sequences of values for coordinates of the occupancy information extraction matrix.

12. A non-transitory computer readable medium having stored thereon machine readable instructions for area occupancy information extraction, the machine readable instructions when executed cause a computer system to:
receive signals from sensors;
determine a number of occupants in each of a plurality of spatial locations based on the received signals;
generate an occupancy information extraction matrix to include entries that include overlays of the received signals over a layout of the plurality of spatial locations and to include correlations between the number of occupants in each of the plurality of spatial locations over time periods;
determine when an occupant is moving and a direction of motion of the occupant based on the received signals;
compare entries in the occupancy information extraction matrix of the number of occupants in the plurality of spatial locations corresponding to successive time periods to determine a most likely trajectory of the occupant;
compare entries in the occupancy information extraction matrix to approximate a rate of change of occupancy for a first spatial location and a rate of change of occupancy for a second spatial location;
determine, from the approximate rate of change of occupancy for the first spatial location and the rate of change of occupancy for the second spatial location, a speed of an occupant travelling from the first spatial location to the second spatial location;
control a service in a first area based on at least one of the determination of the number of occupants, the determination of when the occupant is moving and the direction of motion of the occupant, and the determination of the most likely trajectory; and
control a further service in a second area based on the determination of the most likely trajectory.

13. The non-transitory computer readable medium of claim 12, wherein the instructions are further to cause the processor to:
determine the most likely trajectory based on historical data that represents typical sequences of values for coordinates of the area occupancy information extraction matrix.

* * * * *